United States Patent [19]

Proctor

[11] 4,364,915
[45] Dec. 21, 1982

[54] PROCESS FOR RECOVERY OF CARBON DIOXIDE FROM FLUE GAS

[75] Inventor: Russell C. Proctor, Missouri City, Tex.

[73] Assignee: Procon International Inc., Des Plaines, Ill.

[21] Appl. No.: 265,768

[22] Filed: May 21, 1981

[51] Int. Cl.³ .................... C01B 31/20; B01D 53/34
[52] U.S. Cl. .................................. 423/437; 423/219; 423/228; 423/229; 423/239
[58] Field of Search ............... 423/220, 228, 229, 437, 423/219, 239

[56] References Cited

U.S. PATENT DOCUMENTS

| Re. 18,958 | 9/1933 | Bottoms | 423/229 |
| 2,593,530 | 4/1952 | Bridges | 423/437 |
| 2,668,748 | 2/1954 | Asbury | 423/229 |
| 3,317,278 | 5/1967 | Ruhemann et al. | 423/437 |
| 3,690,816 | 9/1972 | Alleman | 423/228 |
| 3,820,965 | 6/1974 | New | 48/197 R |
| 3,959,170 | 5/1976 | Mago et al. | 252/189 |

FOREIGN PATENT DOCUMENTS 504620 7/1954 Canada ................... 423/228

OTHER PUBLICATIONS

U.S. patent application Ser. No. 491,082 filed Jul. 23, 1974 by Meyer Steinberg entitled "A Combined Coal Fired Process for Production of Power and Liquid Fuel" (available NTIS).
Kirk-Othmer Encyclopedia of Chemical Technology, 2nd edition, vol. 4, pp. 357-369.
Gas Purification, 3rd edition, p. 97, by Arthur L. Kohl et al., published by Gulf Publishing Company, Houston, Tex.

Primary Examiner—Earl C. Thomas
Attorney, Agent, or Firm—James R. Hoatson, Jr.; John F. Spears, Jr.; William H. Page, II

[57] ABSTRACT

A process for the recovery of carbon dioxide from a flue gas stream containing residual oxygen is disclosed. A combustible fuel, such as methane, is admixed with the flue gas stream and the flue gas stream is then passed into a combustion zone in which it may be contacted with a catalyst which promotes the consumption of the residual oxygen in a combustion reaction. Preferably, the heat liberated in the combustion reaction is recovered for use in heating flue gas to combustion supporting conditions and in downstream carbon dioxide recovery steps. The purpose of the combustion reaction is to lower the oxygen content of the flue gas stream, which is then contacted with a lean carbon dioxide absorbing amine solution. The low oxygen content reduces the degradation of the amine solution and the corrosiveness of the amine solution thus allowing the use of high strength amine solutions and very high absorbent liquid loadings.

25 Claims, 1 Drawing Figure

U.S. Patent  Dec. 21, 1982  4,364,915
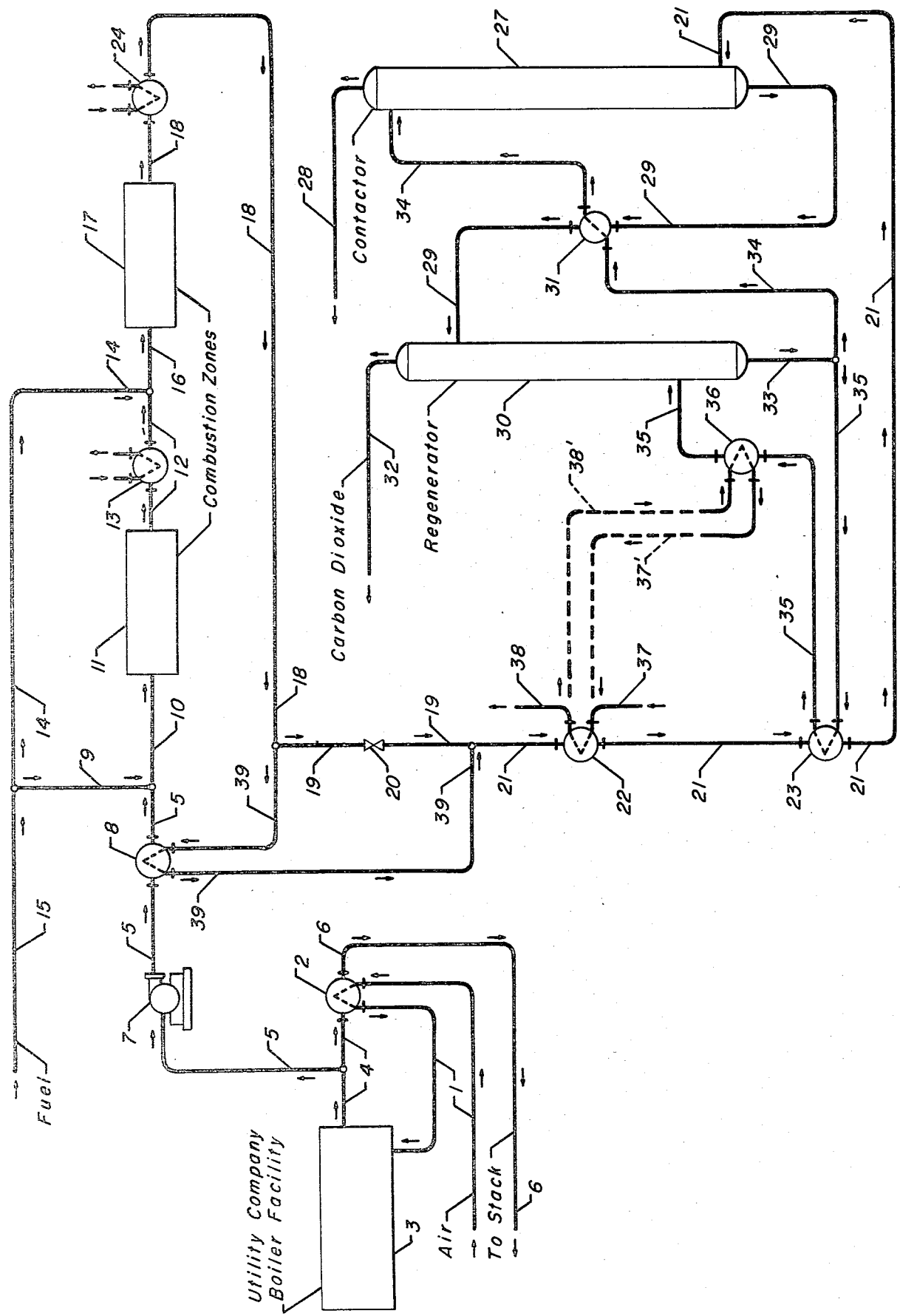

PROCESS FOR RECOVERY OF CARBON DIOXIDE FROM FLUE GAS

FIELD OF THE INVENTION

The invention relates to a process for the recovery of carbon dioxide from a flue gas stream such as is produced in the boiler of an electrical generating plant. The invention therefore relates to processes for the recovery of acid gases from a vapor stream. The invention also relates to processes which utilize a liquid absorbent, preferably an aqueous amine solution, to recover carbon dioxide from a gas stream. A specific concern of the inventive concept is the prevention or lessening of corrosion and absorbent degradation in an absorber-stripper system using an aqueous amine solution as the scrubbing liquid for the recovery of carbon dioxide.

PRIOR ART

Carbon dioxide is often referred to as an acid gas. Two of the basic references on the removal of acid gases from gas streams using aqueous amine solutions are U.S. Pat. Nos. Re. 18,958 and 2,668,748. U.S. Pat. No. 3,690,816 also describes the removal of carbon dioxide from a gas through the use of an amine solution.

The recovery of carbon dioxide from a gas stream through the use of a liquid absorbent is a well-known and well developed process. The removal of carbon dioxide from gases, such as flue gas, through the use of an aqueous alkanolamine solution in a countercurrent absorption column is described in U.S. Pat. No. 3,959,170 (Cl. 252-189). This reference is also pertinent for its discussion of the corrosion problems associated with this process and various alternatives available to decrease corrosion rates. The recovery of carbon dioxide from flue gas streams is for use in the synthesis of carbonaceous products described in U.S. Pat. No. 3,820,965 and in U.S. patent application Ser. No. 491,082 (July 23, 1974), which is available through the National Technical Information Service.

The commercial production of carbon dioxide, including various methods of recovery and purification, are described at pages 357–369 of Volume 4 of the second edition of the Kirk-Othmer *Encyclopedia of Chemical Technology*. Included is a description of the recovery of carbon dioxide from flue gases produced by burning a carbonaceous fuel. The cooled flue gas is passed upward through an absorption tower in which a liquid absorbent passes downward. The liquid absorbent may be an amine solution as in the Girbotol amine process described in this reference, which refers to previously cited U.S. Pat. No. Re. 18,958. This patent is believed to be the basic patent on the use of amine solutions to absorb acid gases.

In the recovery of food grade carbon dioxide from gas streams containing ethane, ethylene and ethylene oxide, it has been the practice to convert these hydrocarbons to carbon dioxide and water. This is performed by adding oxygen to the gas stream and then contacting the gas stream against a catalyst comprising nickel and platinum. Heat released by the resultant exothermic reaction is recovered by heat exchange of the feed and effluent gas streams of the reaction zone.

The corrosive characteristics of ethanolamine solutions which have been exposed to oxygen is well documented and is often partially counteracted through the use of corrosion inhibitors. Minimizing contact of the solution with oxygen is also helpful as shown at page 97 of the third edition of *Gas Purification*, by Arthur L. Kohl, et al., published by Gulf Publishing Co., Houston, Tex.

BRIEF SUMMARY OF THE INVENTION

The invention is an improved process for recovering carbon dioxide from a flue gas stream or other gas stream which comprises carbon dioxide, nitrogen, and oxygen. The invention relates to the reduction of the corrosive properties and of the oxidative degradation of an amine solution which is used to remove carbon dioxide from a flue gas stream. The inventive concept involves adding a small amount of a combustible fuel to the gas stream and contacting the gas stream with a combustion catalyst to consume residual oxygen in the flue gas stream. The resultant lower oxygen content of the flue gas stream lowers the rate at which the amine solution is degraded by oxidation and hence lowers the corrosiveness of the amine solution. The heat released by the combustion is preferably recovered for use in regenerating the carbon dioxide-rich amine solution produced in an absorption zone.

One embodiment of the invention may be broadly characterized as a process for recovering carbon dioxide from a flue gas stream which comprises heating a flue gas stream by indirect heat exchange against a relatively hot gas stream; admixing a combustible gaseous fuel into the flue gas stream; passing the flue gas stream through a combustion zone in which it is contacted with a combustion catalyst maintained at combustion conditions and thereby reducing the oxygen content of the flue gas stream to less than 100 ppm; cooling at least a portion of the flue gas stream by indirect heat exchange as the relatively hot gas stream specified above; contacting the flue gas stream with a lean carbon dioxide absorbing liquid in an absorption zone to form a rich carbon dioxide absorbing liquid; and recovering carbon dioxide from the rich carbon dioxide absorbing liquid in a regeneration zone.

BRIEF DESCRIPTION OF THE DRAWING

The Drawing illustrates the recovery of carbon dioxide from a portion of a flue gas stream carried through lines 4 and 5 from the boiler facility 3 of a public utility. The flue gas stream is heated in heat exchange means 8, admixed with fuel from line 9 and passed into the first of two combustion zones 11 and 17. The low oxygen content treated flue gas is removed in line 18 and may pass through the heat exchanger 8 before entering a vapor-liquid contactor via line 21. A descending liquid from line 34, preferably an amine solution, absorbs carbon dioxide from the low oxygen content flue gas and is passed into a regenerator 30 through line 29. Carbon dioxide is released from the liquid by high temperature stripping and removed as a product stream in line 32. The absorbent liquid may be regenerated in part using heat recovered from the entering flue gas stream in heat exchange means 22 and 23.

DETAILED DESCRIPTION

Carbon dioxide is a useful chemical compound which finds many industrial and commercial applications. It may be used as a reactant, a relatively inert gas, or as a coolant if liquefied. Carbon dioxide is solidified to produce dry ice and is also used for carbonating beverages. The present increasing prices of crude petroleum have resulted in an explosion in efforts to develop and implement enhanced crude oil recovery techniques. One of the more promising of these techniques is the injection of carbon dioxide into crude oil source structures which have been produced using conventional primary techniques. This secondary oil recovery technique is described in U.S. Pat. No. 3,442,332 and in other references. In order to utilize this enhanced recovery method on a large scale huge amounts of carbon dioxide will be required, with the amounts required most probably exceeding the available surplus capacity of conventional carbon dioxide production facilities.

It has been recognized that carbon dioxide can be recovered from flue gas streams, in which it is present at relatively high concentrations as compared to air since it is a product of combustion. However, a number of other gases, such as nitrogen, oxygen, oxides of nitrogen and possibly sulfur oxides, are also present and result in certain operational and economic problems. One of these problems is the result of residual oxygen being present in the flue gas stream. Oxygem tends to react with amine-type absorbents thereby causing degradation of the amines into corrosive and nonproductive compounds which must be removed from the amine solution by "reclaiming". This increases the costs of operating the process and the necessity of using corrosion-resistant metals increases the cost of the required process equipment. Also, the normal absorber-stripper type of system which recovers acid gases such as carbon dioxide requires a net input of heat for the stripping or regeneration of the absorption liquid. It is believed that this has resulted in the great majority of carbon dioxide production being from sources other than flue gas.

It is therefore an objective of the subject invention to provide a process for recovering carbon dioxide from presently available gas streams. It is another objective of the subject invention to provide an economical and efficient process for recovering carbon dioxide from a flue gas stream. It is a specific objective of the subject invention to reduce or eliminate the problems associated with the degradation of amine scrubbing solutions when used in the recovery of carbon dioxide from a flue gas stream. As used herein, the term "flue gas" is intended to refer to a gas stream comprising water, nitrogen and carbon dioxide which is produced by the combustion, with air as an oxygen source, of a combustible hydrocarbonaceous fuel in a furnace, boiler or heater. This flue gas stream will also contain residual oxygen prior to entering the combustion zone of the subject process. The flue gas streams which form the feed streams to the subject process are to be the final effluent of a furnace or heater rather than the initial product of a staged combustion sequence and will have the highest carbon dioxide content of any flue gas stream leaving the furnace or heater.

The subject invention reduces or eliminates many of the problems set out above by decreasing the oxygen content of the flue gas stream prior to the contacting of the flue gas with the carbon dioxide absorbing liquid. This is accomplished by adding a combustible vaporous fuel to the flue gas stream and then passing the flue gas stream into a combustion zone in which the oxygen is consumed in a combustion reaction. The heat liberated by this combustion is recovered for use in regenerating the carbon dioxide absorbing liquid. As used herein, the term "combustion" is intended to indicate the exothermic chemical reaction of oxygen with a carbon-containing compound or hydrogen. The amount of residual oxygen in the flue gas entering the process may be quite low, and may be below 2 mole percent. However, it is expected that most feed flue gas streams will contain at least 3 mole percent oxygen with some flue gas streams containing as much as 7–9 mole percent oxygen.

The subject process reduces the oxygen content of the flue gas stream to low levels at which the degradation of the preferred amine solutions is primarily the result of factors other than the presence of oxygen. This low level of degradation, basically due to iron compounds and thermal effects, may be quite adequately controlled with inhibitors. This means a relatively high strength amine solution can be used. The use of a high strength amine solution combined with a high loading of carbon dioxide (moles absorbed per mole of absorbent) reduces the rate at which the absorbent must be circulated and regenerated. The overall operating (utility) costs of recovering the carbon dioxide by use of an absorbent liquid are thereby reduced.

The invention may be readily understood by an examination of the Drawing, which illustrates the preferred embodiment of the invention. A stream of air withdrawn from the atmosphere enters the process through line 1 and is heated in an air preheater 2 of customary design. The air then continues into a utility company boiler facility 3 wherein it is utilized in the combustion of a hydrocarbonaceous fuel which enters the boiler facility through a line not shown. The flue gas stream which is produced in the furnace of the boiler facility emerges through line 4, with a portion being carried by line 6 through the air preheater 2 and to the customary stack facilities.

A normally smaller portion of the total flue gas stream of the boiler facility is diverted through line 5 and is admixed with any additional flue gas streams which are to be processed. The relatively warm flue gas stream carried by line 5 is compressed in a compressor 7 to a superatmospheric pressure and is then heated in an indirect heat exchanger 8. The flue gas stream carried by line 5 is then admixed with a small amount of natural gas or other gaseous fuel carried by line 9, and the resultant admixture is passed into a first combustion zone 11 through line 10. The admixture of the flue gas and the fuel is therein preferably contacted with a bed of a combustion-promoting catalyst under conditions at which the catalyst is effective in promoting the reaction of the added fuel with residual oxygen present in the flue gas stream. This results in the consumption of a portion of the residual oxygen of the flue gas stream and the release of heat in the exothermic combustion reaction. Therefore as a result of this contacting there is produced a first combustion zone effluent stream, which is carried by line 12, having a lower oxygen content than the flue gas stream carried by line 5 and also having a higher temperature than the gaseous admixture which entered the first combustion zone through line 10. Heat is recovered from the first combustion zone effluent stream in an indirect heat exchange means 13 as by the production of medium or high pressure steam.

A second portion of the gaseous fuel which enters the process through line 15 is admixed with the cooled first combustion zone effluent stream through line 14. The new fuel-containing admixture is then passed into a second combustion zone 17 through line 16. The entering admixture, which comprises the fuel and residual oxygen, is preferably contacted with a second bed of combustion-promoting catalysts at suitable combustion-promoting conditions within this zone although no catalyst need be present in the combustion zones. It is preferred that the fuel passed into the second combustion zone is the same fuel as is passed into the first combustion zone, and that the same catalyst is utilized in both combustion zones. However, different fuels and different catalysts could be used in the two combustion zones. It is also possible that the combustion-promoting conditions could be different within the two combustion zones although the use of substantially similar conditions is preferred.

The contacting performed in the second combustion zone will produce a second combustion zone effluent stream which has an elevated temperature due to the exothermic reaction occurring in the combustion zone and which has a substantially reduced oxygen content compared to the flue gas stream carried by line 5. The second combustion zone effluent stream is cooled in an indirect heat exchange means 24 which may be used to produce medium or high pressure steam. The flow of the second combustion zone effluent stream through line 18 is preferably divided into two portions at a rate controlled by a control valve 20 located in line 19. In this manner, a portion of the second combustion zone effluent stream is caused to flow through line 39 at a controlled rate which is sufficient to add the required heat to the flue gas stream of line 5 in the indirect heat exchange means 8. The two portions of the second combustion zone effluent stream are then recombined and passed into line 21. The second combustion zone effluent stream is then further cooled in indirect heat exchange means 22 and 23 and in other cooling means not shown and passed into the bottom of a vertical contactor 27. The flue gas stream rises through the contactor countercurrent to a descending stream of a liquid absorbent which is preferably an aqueous amine solution. A substantial portion of the carbon dioxide present in the flue gas stream which enters the contactor is transferred to the absorbent solution to thereby produce a carbon dioxide-rich absorbent solution which is removed from the bottom of the contactor through line 29. The residual components of the flue gas stream emerge from the top of the contactor and are passed to the appropriate facilities through line 28 before being released into the atmosphere.

A carbon dioxide-rich absorbent solution removed from the bottom of the contactor 27 through line 29 is heated by indirect heat exchange in a heat exchange means 31 and is then passed into an upper portion of an absorbent regenerator 30. The liquid phase rich absorbent flows downward countercurrent to rising vapors produced at the bottom of the regenerator in a customary manner. The utilization of the proper regeneration conditions results in the production of a stream of carbon dioxide-lean absorbent solution which is removed from the bottom of the regenerator in line 33. The carbon dioxide which is released from the absorbent solution emerges from the top of the regenerator through line 32 for transfer to the proper storage or other handling facilities. A first portion of the lean absorbent liquid carried by line 33 is cooled in the indirect heat exchange means 31 and is then passed into the top of the contactor 27. The remaining portion of the lean absorbent carried by line 33 is passed into line 35 and flows through the indirect heat exchange means 23 for the recovery of heat from the second combustion zone effluent stream. This absorbent stream then flows through a reboiler 36 in which it is partially vaporized and into the bottom of the regenerator 30. Heat may be removed from the second combustion zone effluent stream by the vaporization of water carried by line 37 to produce steam removed from the process in line 38. However, in one embodiment of the invention, the heat transferred in the indirect heat exchange means 22 is utilized to reboil the regenerator 30 in a closed loop system comprising lines 37' and 38'. This system could comprise a hot oil belt similar to those employed in reboiling fractionation columns. The Drawing is intended only to clearly convey the inventive concept. Various details of the process flow which should be well known to those skilled in the art, such as pumps, level and pressure control systems, flow controllers, overhead condensers, interstage coolers, etc., have therefore not been shown.

One embodiment of the invention may accordingly be characterized as a process for recovering carbon dioxide from a flue gas stream which comprises the steps of heating a flue gas stream by indirect heat exchange against a hereinafter characterized relatively hot gas stream; admixing a combustible fuel into the flue gas stream; passing the flue gas stream through two combustion zones in which the flue gas stream is contacted with a combustion catalyst at combustion-promoting conditions and thereby reducing the oxygen content of the flue gas stream to less than 100 ppm; cooling at least a portion of the flue gas stream by indirect heat exchange as the previously specified relatively hot gas stream; contacting the flue gas stream with a lean aqueous amine solution in an absorption zone operated at absorption-promoting conditions and thereby forming a rich aqueous amine solution; and recovering carbon dioxide from the rich aqueous amine solution.

The flue gas stream is preferably gathered from the combustion zone of a boiler of a public utility which generates electrical power. Although any fuel including coal or solid wastes could be consumed in this combustion zone, it is preferred that the process be applied to a flue gas produced from a relatively sulfur-free fuel to minimize the concentration of sulfur oxides in the flue gas. Heat is normally recovered from power plant flue gas streams in an air preheater which transfers the recovered heat to air enteriang the power plant's combustion zone. It is preferred that if feasible the flue gas stream used in the subject process be removed from the main flue gas stream at a point upstream of the air preheater. In this way a warmer stream is obtained and less heat is required to heat the stream entering the process. However, this reduces the amount of heat available for use in the air preheater which in turn lowers the temperature of the air fed to the power plant combustion zone. This can result in increased fuel costs to the power plant and in some instances this may make it preferable to withdraw the flue gas stream used in the subject process from the main flue gas stream at a point downstream of the air preheater. The entire flue gas stream removed from the power plant or other source could be charged to the subject process, but it is expected that only a portion, typically 5–70 vol.%, of the total flue gas will enter the process.

The flue gas stream will contain a small amount of residual oxygen. This will be due in part to the excess oxygen which is charged to the boiler to ensure total consumption of the fuel. Some oxygen will also leak in as air leakage into the flue gas stream across the air preheater since the flue gas will normally be at a lower pressure than the inlet air. The oxygen content of the flue gas stream is often rather low since the amount of excess air is minimized in order to maximize flame temperatures and available heat recovery in the power plant. The carbon dioxide concentration in the flue gas stream will normally be between about 8 and about 11 mole percent, with 9 mole percent being a representative concentration. It is preferred that the power plant (source) combustion zone is operated as close as practical to the stoichiometric conditions which would result in total consumption of both the entering fuel and the entering oxygen. This may result in a greater production of carbon monoxide, but this may be used to consume residual oxygen in the catalytic combustion zone of the subject process. Removing the flue gas feed stream from the boiler stack upstream of the preheater will also eliminate any leakage of air into the flue gas as occurs with rotating heat exchangers such as the Lungstrom type. This aids is minimizing the oxygen content of the flue gas stream.

The feed flue gas stream which has been withdrawn from the power plant vent system is first compressed to a pressure of about 1 to about 4.5 psig. This is necessary to cause the low pressure gas to flow through the various zones and heat exchangers of the subject process. The feed flue gas stream will normally have a temperature between about 310° and about 435° C. when it is obtained from a point upstream of the air preheater and will be heated to a somewhat higher temperature by the compression. The flue gas stream is then heated as necessary to increase its temperature to the desired inlet temperature of a downstream combustion zone. Normally, this inlet temperature is above 400° C. The required heating must be sufficient to account for the addition of a combustible fuel, which may be rather cool and dilute, and various heat losses as through duct system walls.

The thus-heated flue gas stream is then admixed with a gaseous combustible fuel and passed into a combustion zone. As used herein, the term "gaseous combustible fuel" is intended to refer to a nonsolid chemical compound or mixture of compounds which will react with oxygen in an exothermic reaction. Examples of such gaseous combustible fuels are hydrogen, carbon monoxide, methane, ethane, propane and butane. More than one of these compounds may be simultaneously admixed into the heated flue gas stream. This would occur if natural gas was used as the fuel source. It is preferred that a relatively low cost gaseous combustible fuel such as an off gas stream of a hydrocarbon conversion, synthetic fuels production, or chemical processing plant is employed as the fuel source. This gas stream could contain relatively low concentrations, less than 20 mole percent, of methane, hydrogen and possibly carbon monoxide and could also contain carbon dioxide at any level from 0 to 90 or more mole percent. A high level of carbon dioxide, relative to the entering flue gas stream, is preferred. It is preferred that the nitrogen content of any fuel source is held to the minimum possible under the circumstances since nitrogen would reduce the carbon dioxide concentration in the downstream adsorption zone. Although it is preferred that the flue gas stream is heated prior to admixture with the gaseous fuel, these two steps could be performed in the reverse order.

After the flue gas stream has been admixed with the combustible fuel and, if necessary, heated to the required temperature, it is passed into a combustion zone. Although a single combustion zone may be employed in the subject process, it is preferred that the flue gas stream is passed through two or three separate catalytic combustion zones in series in a manner similar to that shown in the Drawing. It is also preferred that an additional amount of the combustible fuel is admixed with the flue gas stream prior to each passage of the flue gas stream into a combustion zone. The amount of the combustible fuel added to the flue gas stream upstream of the first combustion zone should be at least 70 mole percent of the total combustible fuel added to the flue gas stream if only two combustion zones are used and at least 50 mole percent if three combustion zones are used in series. The preferred inlet temperature to a catalytic combustion zone is about 510° C. (950° F.) although the inlet temperature could vary over a range extending to lower temperatures down to about 288° C. (550° F.) if the combustion-promoting catalyst has sufficient activity at these lower temperatures. Temperatures above 510° C. including temperatures of about 540° C. (1004° F.) or higher could be employed if desired or required by the catalyst. As the temperature of utility power plant flue gas streams upstream of the air preheater is typically at a temperature between 316° and 426° C. (600° and 800° F.), very little heating of the flue gas stream will normally be required if it is obtained upstream of the air preheater. A temperature rise of about 110 centigrade degrees may be expected as a flue gas stream having a typical oxygen concentration passes through a combustion zone, with higher or lower temperature rises resulting from higher or lower oxygen concentrations respectively. The maximum desired temperature rise through a single catalytic combustion zone is 165 centigrade degrees. Also, the preferred oxidation support material should not be exposed to temperatures above about 760°-787° C. This and the desire to limit per pass temperature increases may require the use of two or more catalytic combustion zones. These limitations do not apply to thermal combustion zones and it is preferred that only a single thermal combustion zone is employed in the process.

Both catalytic and thermal combustion zones have their advantages. A catalytic combustion zone may be able to reduce the discharge of atmospheric pollutants from the flue gas source. For instance, the combustible fuel would act as a reductant for nitrogen dioxide when passed over the catalyst. This may ease compliance with air pollution regulations and allow the carbon dioxide recovery process to come on stream sooner. An advantage of a thermal combustion zone is the ability to perform the combustion without having to pass the flue gas stream through a bed of catalyst. This becomes an advantage in coal-fired power plants or other applications in which the flue gas stream may contain ash or soot which could plug the catalyst bed or increase operation problems in other ways. A second advantage of a thermal combustion zone is that the heat released by the combustion reaction is released at a higher temperature. This allows the recovery of more useful "higher level" heat than the lower temperature catalytic combustion, as by the production of steam having a higher temperature than possible with catalytic combustion.

The combustion zone(s) may contain a solid catalytic composite which promotes the reaction of the residual oxygen in the flue gas stream with the combustible fuel which was admixed into the flue gas stream. This catalytic composite or combustion catalyst will preferably comprise an inorganic oxide support such as alumina, silica, titania, thoria, bauxite, various clays and naturally occurring or synthetic aluminosilicates. The preferred support material is alumina. The combustion catalyst will also contain a catalytically effective amount of a combustion promoter. This will normally be a metal chosen from Group VIII of the Periodic Table of elements such as iron, cobalt or nickel. It is preferred that a Group VIII base metal is present at a concentration equal to less than 10 and more preferably less than 5 wt.% of the total composite based on the elemental metal. The catalytic composite may contain two or more metals, and preferably contains a Group VIII base metal, cerium, and a platinum group metal chosen from the group consisting of ruthenium, rhodium, palladium, osmium, iridium and platinum.

Several platinum group metals may be present, with platinum being the preferred platinum group metal. The platinum group metals are preferably present at a concentration equal to less than 1.0 wt.% of the total composite based on the elemental metal. The combustion-promoting components of the catalytic composite preferably also include cerium at a total concentration up to about 5 wt.%.

The support component of the catalytic composite may be in the form of spheres, pellets, extrudates or irregular shaped pieces formed by sequential crushing and fines separation operations. The spheres would have a diameter between about $\frac{1}{8}$-inch and $\frac{3}{8}$-inch. It is preferred that the support component is similar to the "monolith" supports used in automotive exhaust gas pollution reduction systems for converting nitrogen oxides and/or hydrocarbons to more acceptable compounds. These monoliths have a large number of straight channels extending through them to allow the passage of reactant gases through the monolith, with the channels giving the support an appearance resembling a honeycomb. The monolith is expected to have between 16 and 600 channels per square inch, with the use of monoliths having fewer than 100 channels per square inch being preferred. The active combustion-promoting components are usually applied to the support component by impregnation. The orientation, support component structure, dimensions and arrangement of the mass of the catalytic composite within the combustion zone is selected to minimize the pressure drop through the combustion zone while achieving sufficient conversion. The pressure drop through a single combustion zone should be less than 15 inches of water and is preferably less than 10 inches of water. The mass of catalytic composite is preferably contained in a large horizontal flat layer having a minimum practical thickness. The flue gas flows vertically through this layer of the catalyst. A vertical catalyst bed or an annular catalyst bed could be employed if desired.

Although the use of a catalytic composite is preferred within the flue gas combustion zone it is not necessary for the practice of the subject process. The oxygen content of the flue gas stream could therefore be reduced by thermal deoxidation in the combustion zone. In this embodiment of the process the flue gas stream-combustible fuel admixture is maintained at thermal deoxidation conditions which include an elevated temperature for a sufficient time to effect the desired degree of oxygen removal. A broad range of elevated temperatures for this purpose is from 787° to about 1093° C. (1450°-2000° F.) and a preferred range of temperatures is from 871° to 982° C. (1600°-1800° F.). A minimum average residence time of 1.5 seconds is preferred although residence times down to 0.5 seconds may be feasible. A residence time of 5.0 or more seconds may be desired at lower temperatures. This residence time may be obtained by recycling a portion of the high temperature flue gas within the flue gas combustion zone as in a loop reactor system.

This thermal deoxidation embodiment of the invention may be broadly characterized as a process for recovering carbon dioxide from a flue gas stream which comprises the steps of heating a flue gas stream by indirect heat exchange; admixing a combustible fuel into the flue gas stream and passing the flue gas stream through a combustion zone maintained at thermal deoxidation conditions and thereby reducing the oxygen content of the flue gas stream; cooling the flue gas stream by indirect heat exchange; contacting the flue gas stream with a lean carbon dioxide absorbing liquid in an absorption zone operated at absorption-promoting conditions and thereby forming a rich carbon dioxide absorbing liquid; and recovering carbon dioxide from the rich carbon dioxide absorbing liquid.

Heat released during the combustion reaction is preferably recovered through the generation of steam which may be used elsewhere in the process or through indirect heat exchange with process streams requiring heating. It is preferred that heat is removed from the flue gas stream at one or more points between any two combustion zones in series and that at least a portion of the treated flue gas stream exiting the terminal combustion zone is heat exchanged against the untreated flue gas stream to supply all of the required heat input to this stream. Those skilled in the art will appreciate the many different heat exchange systems which could be devised and which differ from the system shown in the Drawing. For instance, the interstage heat exchanger 13 could be used to produce steam, to heat steam, to heat a process stream or to provide heat for reboiling the downstream absorbent regenerator. After exiting from the terminal combustion zone, the flue gas stream should be cooled as much as practical in heat exchange devices which recover the heat for further utilization. A portion of this heat could be recovered by indirect heat exchange against a portion of the air which is entering the primary combustion zone. This may be done to augment the customary air preheater or a separate air stream may be heated by exchange against the flue gas combustion zone effluent stream and then passed directly into the primary combustion zone. When an aqueous carbon dioxide absorbent is used, it is desirable to cool the treated flue gas to a very moderate temperature of less than about 38° C. (100° F.) and to saturate the treated flue gas with water.

The treated flue gas stream should contain less than 200 ppm (mole basis) oxygen. Preferably it contains less than 100 ppm oxygen and more preferably less than 50 ppm oxygen after passage through the combustion zone(s). The minimum oxygen concentration actually achieved in the process will be set by the effectiveness of the combustion zone, if a stoichiometric amount of fuel is present, at the chosen operating conditions. It is believed that the total removal of oxygen is not required and that the process should be operated to result in the reaction of essentially all added fuel in the combustion zone(s). That is, it is preferred to add only sufficient fuel to achieve the desired oxygen consumption and to run the terminal combustion zone or area of a zone in a fuel "starved" condition. The amount of fuel added to the initial or terminal combustion zones of a multi zone series could be varied to effect this mode of operation.

The variation in the amount of fuel added is preferably set by a control means which operates in conjunction with an on-line monitor. This monitor would measure the concentration of one or more chemical compounds, such as oxygen, carbon monoxide, methane, propane or hydrogen, at one or more points within and/or between the combustion zone(s) and would then generate the appropriate signal for transmittal to the control means regulating the flow of the added fuel.

The oxygen-deficient combustion zone effluent stream, which is also referred to herein as the treated flue gas stream, is contacted with a liquid absorbent which is capable of reversibly absorbing economically viable quantities of carbon dioxide. It is preferred that the absorbent comprises an aqueous solution and an aqueous amine solution is especially preferred. This may be monoethanolamine (MEA), diethanolamine, triethanolamine, diisopropanolamine, etc. The use of MEA is preferred. The concentration of the MEA is preferably above 20 wt.% and more preferably is kept between 25 and 35 wt.% in the absorbent. The carbon dioxide is normally tied up in an amine solution in the form of a carbonate. When MEA is used as the absorbent, the total accumulation of carbon dioxide and any other acid gases present in the gas being contacted is generally kept within the range of from about 0.25 to about 0.40 mole of carbon dioxide per mole of MEA. Operation with other absorbents and other absorbent loadings and concentrations is also acceptable.

Any economical and effective method of contacting the carbon dioxide-containing gas with the absorbent may be employed to recover the carbon dioxide. It is preferred that a conventional packed vertical column be used to provide efficient multi-stage contact. A properly designed and operated column containing two packed beds of about 10 feet each is normally adequate as a countercurrent contactor. A trayed column could be employed if desired. The gas stream is preferably passed into the lower end of the contacting column at a temperature less than about 65° C. (150° F.) and more preferably at a temperature less than 37.8° C. (100° F.). The gas stream could be cooled within the lowermost portion of the contactor by means provided for this purpose, but it is preferred that the gas stream is cooled to the desired temperature prior to entering the contactor. The gas stream may be passed through a water quench zone in which it is contacted with liquid water to cool and saturate the gas. The contacting zone should be maintained at carbon dioxide absorption-promoting conditions. These conditions include a superatmospheric pressure which preferably is above about 1 psig and normally within the range of from 0.5 to 3 psig. These conditions also include a temperature which is between about 26.7° C. (80° F.) and about 65° C. (150° F.). The maximum desired temperature should not be exceeded at any point in the contactor.

The carbon dioxide loaded absorbent liquid, which is referred to herein as a "rich" absorbent, is removed from the contactor and transferred to a regenerator which is also referred to in the art as a stripper or stripping column. The preferred amine-type absorbents generally release carbon dioxide at temperatures above about 100° C. (212° F.). The absorbent regenerator is therefore operated at a higher temperature than the contactor. A broad range of amine regeneration conditions includes a bottoms temperature of between about 100° C. and about 148.9° C. (300° F.). Temperatures above the upper end of this range tend to cause degradation of the preferred amine solutions and are therefore to be avoided. The pressure in the regenerator is preferably between approximately 6 and 10 psig as measured at the top of the regenerator but pressures outside this rather limited range may also be employed. The preferred regenerator is a rather conventional vertical packed or trayed column having the equivalent of between 15 and 30 actual trays. The rich absorbent preferably enters several trays below the top of the contactor, which receives external reflux on its uppermost tray. The use of a separate reclaimer together with an external reboiler is preferred. A thorough article on the operation of amine-type absorbers is provided at page 115 of the May 12, 1980 edition of *The Oil and Gas Journal.* Other regeneration methods may be required if an absorbent other than the preferred amine-type absorbent is utilized in the process. Other methods of recovering the carbon dioxide could be employed if desired. These include the use of selective semipermeable membranes and solid absorbents and adsorbents.

I claim as my invention:

1. A process for recovering carbon dioxide from a flue gas stream which comprises the steps of:
   (a) admixing a combustible fuel into a flue gas stream;
   (b) passing the flue gas stream through a combustion zone in which the combustible fuel is reacted with oxygen originally present in the flue gas stream;
   (c) cooling the flue gas stream;
   (d) contacting the flue gas stream with a lean absorber liquid comprising an aqueous amine solution which absorbs carbon dioxide at carbon dioxide absorbing conditions in a contacting zone; and,
   (e) recovering carbon dioxide from the absorber liquid.

2. The process of claim 1 further characterized in that the flue gas stream is heated prior to the admixture of the combustible fuel into the flue gas stream.

3. The process of claim 2 further characterized in that the flue gas stream is heated by indirect heat exchange against at least a portion of the flue gas stream which has passed through the combustion zone.

4. The process of claim 3 further characterized in that the combustion zone does not contain a bed of a combustion catalyst and in that the oxygen content of the flue gas stream is reduced by thermal deoxidation.

5. The process of claim 3 further characterized in that the combustion zone contains a bed of a combustion catalyst.

6. The process of claim 1 further characterized in that the flue gas stream contains less than 200 ppm oxygen after passage through the combustion zone.

7. The process of claim 4 further characterized in that the flue gas stream contains less than 100 ppm oxygen after passage through the combustion zone.

8. The process of claim 1 further characterized in that the flue gas stream is passed through two combustion zones in series.

9. The process of claim 8 further characterized in that the flue gas stream is cooled and admixed with additional fuel between the two combustion zones.

10. The process of claim 1 further characterized in that the aqueous amine solution contains at least 20 wt.% monoethanolamine.

11. The process of claim 10 further characterized in that the absorber liquid comprises monoethanolamine.

12. The process of claim 1 further characterized in that the flue gas stream entering the process contains more than 2 mole percent oxygen.

13. A process for recovering carbon dioxide from a flue gas stream which comprises the steps of:
(a) heating a flue gas stream by indirect heat exchange against a hereinafter characterized relatively hot gas stream;
(b) admixing a combustible fuel into the flue gas stream;
(c) passing the flue gas stream through a combustion zone in which the flue gas stream is contacted with a combustion catalyst at combustion-promoting conditions and thereby reducing the oxygen content of the flue gas stream to less than 200 ppm;
(d) cooling at least a portion of the flue gas stream by indirect heat exchange as the previously specified relatively hot gas stream of step (a);
(e) contacting the flue gas stream with a lean carbon dioxide absorbing liquid comprising an aqueous amine solution in an absorption zone operated at absorption-promoting conditions and thereby forming a rich carbon dioxide absorbing liquid; and,
(f) recovering carbon dioxide from the rich carbon dioxide absorbing liquid.

14. The process of claim 13 further characterized in that the aqueous amine solution comprises monoethanolamine.

15. The process of claim 13 further characterized in that the amine solution contains at least 20 wt.% monoethanolamine.

16. The process of claim 13 further characterized in that the flue gas stream is passed through two combustion zones in series and is admixed with additional combustible fuel between the two combustion zones.

17. The process of claim 16 further characterized in that the combustible fuel comprises methane.

18. The process of claim 16 further characterized in that the combustible fuel comprises propane.

19. The process of claim 20 further characterized in that the combustible fuel comprises carbon monoxide.

20. The process of claim 13 further characterized in that at least a portion of the heat expended in the recovery of carbon dioxide from the rich carbon dioxide absorbing liquid is obtained from the flue gas stream after the flue gas stream has passed through the combustion zone.

21. The process of claim 14 further characterized in that carbon dioxide is recovered by passing the rich carbon dioxide absorbing liquid into a regeneration zone which is reboiled with heat recovered by indirect heat exchange against the flue gas stream at a point downstream of the initial cooling performed in step (d).

22. A process for recovering carbon dioxide from a flue gas stream which comprises the step of:
(a) heating a flue gas stream by indirect heat exchange;
(b) admixing a combustible fuel into the flue gas stream and passing the flue gas stream through a combustion zone maintained at thermal deoxidation conditions and thereby reducing the oxygen content of the flue gas stream;
(c) cooling the flue gas stream by indirect heat exchange;
(d) contacting the flue gas stream with a lean carbon dioxide absorbing liquid comprising an aqueous amine solution in an absorption zone operated at absorption-promoting conditions and thereby forming a rich carbon dioxide absorbing liquid; and,
(e) recovering carbon dioxide from the rich carbon dioxide absorbing liquid.

23. The process of claim 22 further characterized in that the flue gas stream is heated prior to passage into the combustion zone by indirect heat exchange against at least a portion of the flue gas stream which has passed through the combustion zone.

24. The process of claim 23 further characterized in that the flue gas stream comprises less than 200 ppm oxygen after having passed through the combustion zone.

25. The process of claim 22 further characterized in that the carbon dioxide absorbing liquid comprises an aqueous solution comprising 20 wt.% of monoethanolamine.

* * * * *